(12) United States Patent
Hong et al.

(10) Patent No.: US 12,554,496 B2
(45) Date of Patent: Feb. 17, 2026

(54) APPARATUS AND METHOD FOR CONFIGURING COOPERATIVE WARPS IN VECTOR COMPUTING SYSTEM

(71) Applicant: Shanghai Biren Technology Co., Ltd, Shanghai (CN)

(72) Inventors: Zhou Hong, Shanghai (CN); YuFei Zhang; ChengKun Sun, Shanghai (CN); Lin Chen, Shanghai (CN); Hao Shu, Shanghai (CN)

(73) Assignee: SHANGHAI BIREN TECHNOLOGY CO., LTD, Shanghai (CN)

( * ) Notice: Subject to any disclaimer, the term of this patent is extended or adjusted under 35 U.S.C. 154(b) by 108 days.

(21) Appl. No.: 17/366,588

(22) Filed: Jul. 2, 2021

(65) Prior Publication Data

US 2022/0121444 A1  Apr. 21, 2022

(30) Foreign Application Priority Data

Oct. 21, 2020  (CN) .......................... 202011131448.9

(51) Int. Cl.
*G06F 9/30* (2018.01)
*G06F 9/38* (2018.01)

(52) U.S. Cl.
CPC ........ *G06F 9/30098* (2013.01); *G06F 9/3001* (2013.01); *G06F 9/30036* (2013.01); *G06F 9/3836* (2013.01); *G06F 9/3851* (2013.01); *G06F 9/3887* (2013.01); *G06F 9/3888* (2023.08)

(58) Field of Classification Search
None
See application file for complete search history.

(56) References Cited

U.S. PATENT DOCUMENTS

| | | | |
|---|---|---|---|
| 2014/0129812 A1 | 5/2014 | Chakrabarti et al. | |
| 2014/0258680 A1 | 9/2014 | Ingle et al. | |
| 2017/0329741 A1* | 11/2017 | Kim | G06F 1/3243 |
| 2018/0165092 A1* | 6/2018 | Du | G06F 9/3836 |
| 2020/0050451 A1 | 2/2020 | Babich et al. | |
| 2020/0073664 A1* | 3/2020 | Ashar | G06F 9/30032 |
| 2022/0027194 A1* | 1/2022 | Damani | G06F 9/4881 |

FOREIGN PATENT DOCUMENTS

| | | |
|---|---|---|
| CN | 103955356 A | 7/2014 |
| CN | 110716755 A | 1/2020 |
| CN | 110858387 A | 3/2020 |
| TW | I494853 B | 8/2015 |

* cited by examiner

*Primary Examiner* — John M Lindlof
(74) *Attorney, Agent, or Firm* — Birch, Stewart, Kolasch & Birch, LLP

(57) ABSTRACT

The invention relates to an apparatus for configuring cooperative warps in a vector computing system. The apparatus includes general-purpose registers (GPRs); an arithmetic logical unit (ALU); and a warp instruction scheduler. The warp instruction scheduler is arranged operably to: allow each of a plurality of warps to access to data of a whole or a designated portion of the GPRs through the ALU in accordance with a configuration by a software when being executed; and complete calculations of each warp through the ALU.

10 Claims, 7 Drawing Sheets

… (1)

APPARATUS AND METHOD FOR CONFIGURING COOPERATIVE WARPS IN VECTOR COMPUTING SYSTEM

CROSS-REFERENCE TO RELATED APPLICATIONS

This application claims the benefit of priority to Patent Application No. 202011131448.9, filed in China on Oct. 21, 2020; the entirety of which is incorporated herein by reference for all purposes.

BACKGROUND

The disclosure generally relates to vector computing and, more particularly, to apparatuses and methods for configuring cooperative warps in a vector computing system.

A vector computer is a computer for executing dedicated vector instructions to increase the speed of vector processing. The vector computer can process the data calculation of multiple warps at the same time. The vector computer is much faster than a scalar computer in terms of processing the data of warps. However, it might conflict when multiple warps access to general-purpose register (GPR) files. Therefore, the present invention proposes apparatuses and methods for configuring cooperative warps in a vector computing system to address or reduce the aforementioned problems.

SUMMARY

The disclosure relates to an embodiment of an apparatus for configuring cooperative warps in a vector computing system. The apparatus includes general-purpose registers (GPRs); an arithmetic logical unit (ALU); and a warp instruction scheduler. The warp instruction scheduler is arranged operably to: allow each of a plurality of warps to access to data of a whole or a designated portion of the GPRs through the ALU in accordance with a configuration by a software when being executed; and complete calculations of each warp through the ALU.

The disclosure further relates to another embodiment of an apparatus for configuring cooperative warps in a vector computing system. The apparatus includes an ALU; and a warp instruction scheduler. The warp instruction scheduler is arranged operably to: allow each of a plurality of warps to have a portion of relatively independent instructions in a kernel in accordance with warp dispatch instructions in the kernel, thereby enabling the ALU to execute the warps independently and in parallel.

The disclosure relates to an embodiment of a method for configuring cooperative warps in a vector computing system. The method includes steps of: allowing each of a plurality of warps to access to data of a whole or a designated portion of GPRs through an ALU in accordance with a configuration by a software when being executed; and completing calculations of each warp through the ALU.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words described the relationship between elements should be interpreted in a like fashion (e.g., "between" versus "directly between," "adjacent" versus "directly adjacent." etc.)

Figure 1:
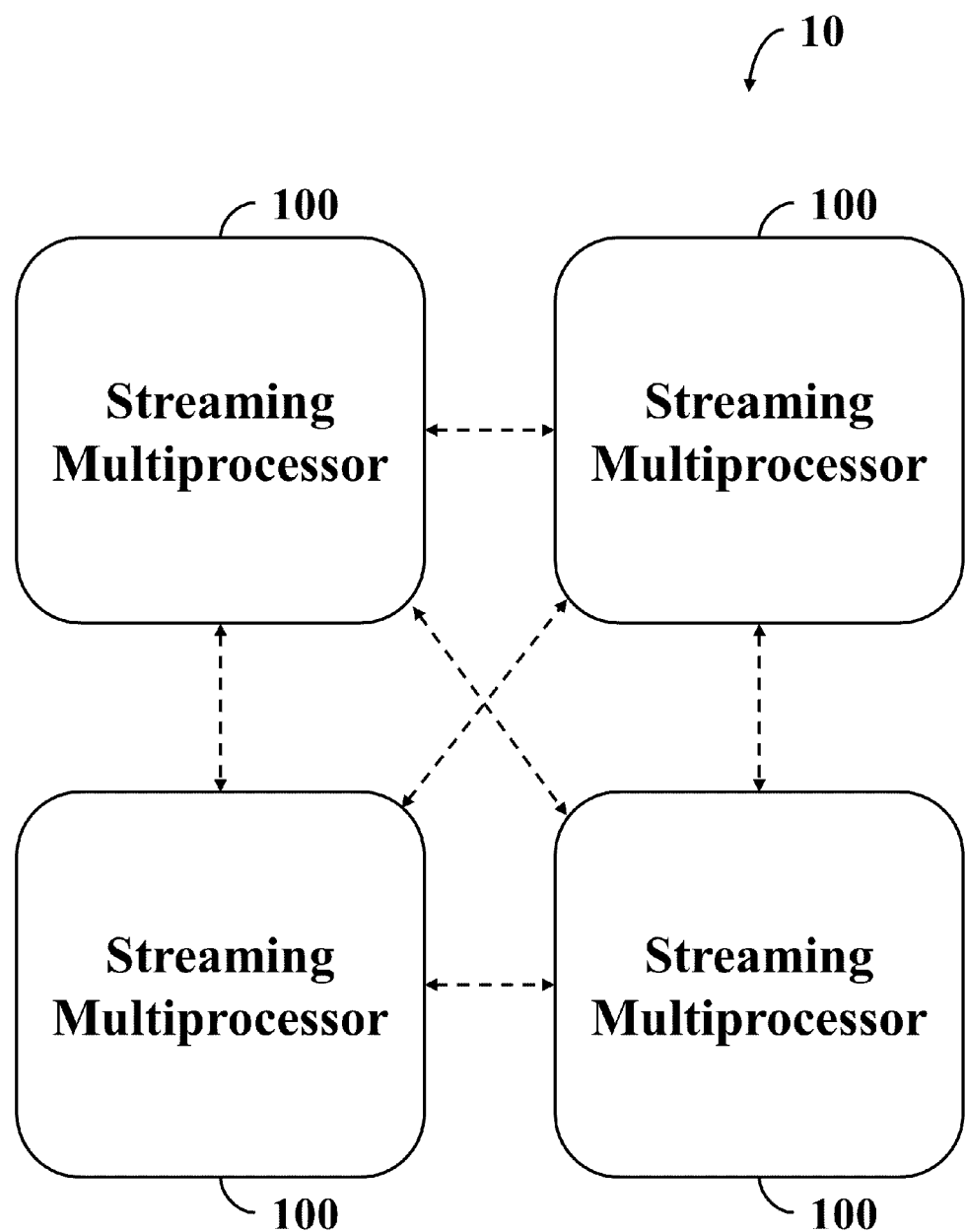
FIG. 1 is a block diagram of a vector computing system according to an embodiment of the invention.

Refer to FIG. 1. The electronic apparatus 10 may be realized in a mainframe, a workstation, a Personal Computer (PC), a laptop PC, a tablet PC, a mobile phone, a digital camera, a digital recorder, or other consumer electronic products. The electronic apparatus 10 is equipped with a streaming multiprocessor cluster (SMC) containing multiple streaming multiprocessor (SMs) 100, and different SMs 100 uses signals to synchronize their instruction executions for each other. The SMs 100 being programmed may perform a variety of application tasks, including but not limited to linear and non-linear data transformation, database manipulation, big data calculation, artificial intelligence computation, audio and video data encoding and decoding, 3D modeling, image rendering, etc. Each SM 100 can execute multiple warps at the same time, and each warp is composed of group of threads. A thread is the smallest unit that is run by hardware, and has its own life cycle. The warp may be associated with a single instruction multiple data (SIMD) instruction, single instruction multiple thread (SIMT) technology, or others. The execution between different warps may be independent or sequential. The thread may represent a task associated with one instruction, or more. For example, each SM 100 may execute 8 warps at the same time, and each warp includes 32 threads. Although FIG. 1 describes four SMs 100, those artisans may dispose more or less SMs in a vector computing system depending on different design requirements, and the invention should not be limited thereto.

Figure 2:
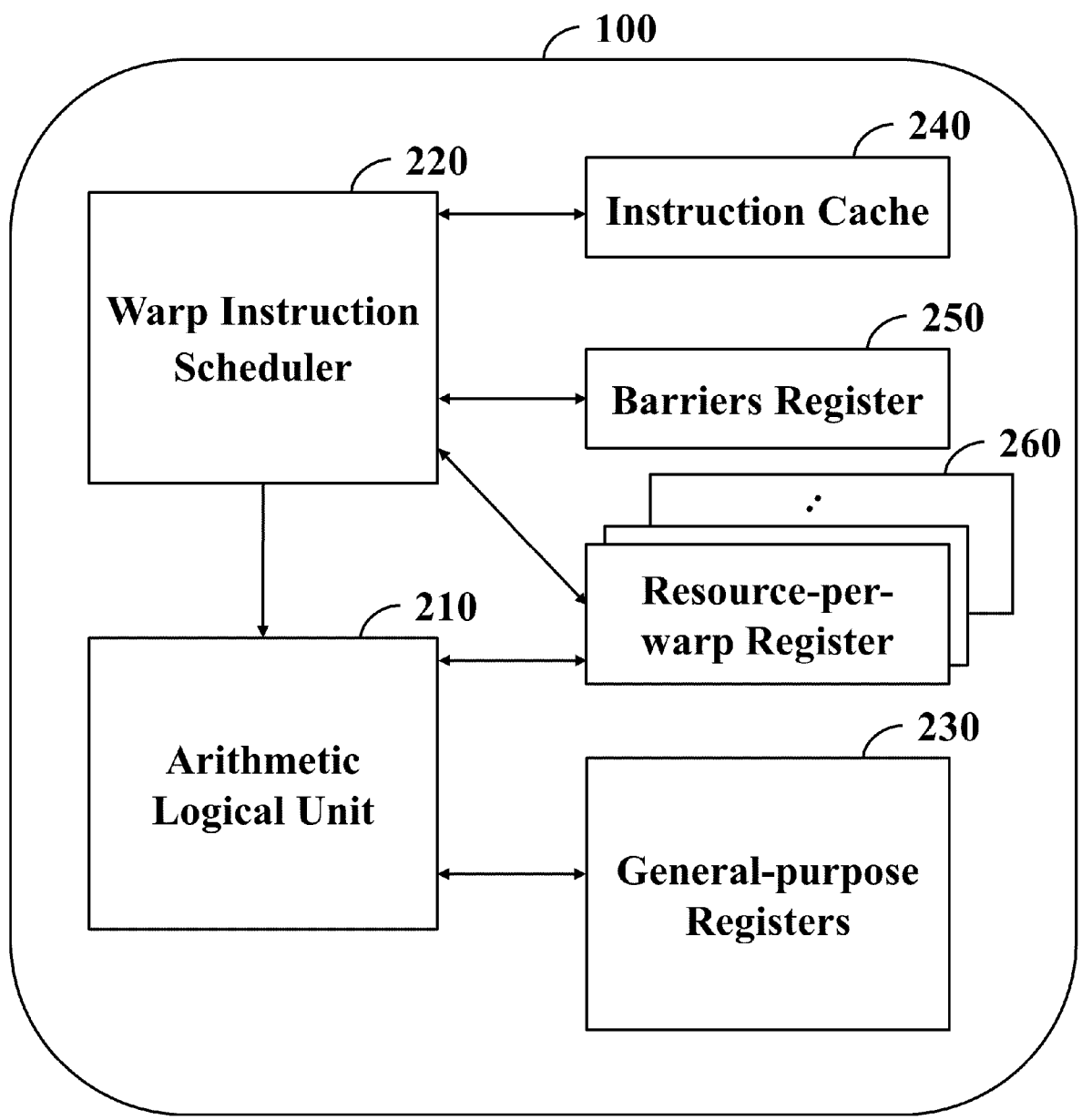
FIG. 2 is a block diagram of streaming multiprocessors according to an embodiment of the invention.

Refer to FIG. 2. Each SM includes the instruction cache 240 for storing multiple instructions of a kernel. Each SM 100 includes the warp instruction scheduler (may be called as warp scheduler in some technical documents) 220 for fetching a series of instructions for each warp and storing them in the instruction cache 240, and obtaining an instruction to be executed from the instruction cache 240 for each warp in accordance with a program counter (PC). Each warp may have an independent PC register for recording the position (i.e. the instruction address) of the instruction currently being executed. The PC corresponding to the designated warp is normally incremented by one every time after an instruction is fetched from the instruction cache 240. The warp instruction scheduler 220 sends instructions to the arithmetic logical unit (ALU) 210 for execution at proper time points, where the instructions are defined in the instruction set architecture (ISA) for the specific computing system. The ALU 210 may perform various operations, such as addition and multiplication of integers and floating-point numbers, comparisons, Boolean operations, bit shifts, algebraic functions (e.g. plane interpolation, trigonometric functions, exponential functions, logarithmic functions), etc. The ALU 210 during the executions may read data from designated locations (also referred to as source addresses) of the general-purpose registers (GPRs) 230, and write back execution results in designated locations (also referred to as destination addresses) of the GPRs 230. Each SM 100 may further include the barriers register 250 that is used by software in execution to synchronize executions between warps. Each SM 310 may further include the resource-per-warp register 260 that is used by software in execution to dynamically configure the space range of the GPRs 230 that can be accessed by each warp. Although FIG. 2 show the components 210 to 260 only, this is merely used to briefly describe the technical features of the present invention, and those artisans would understand that each SM 100 includes more components.

Figure 3:
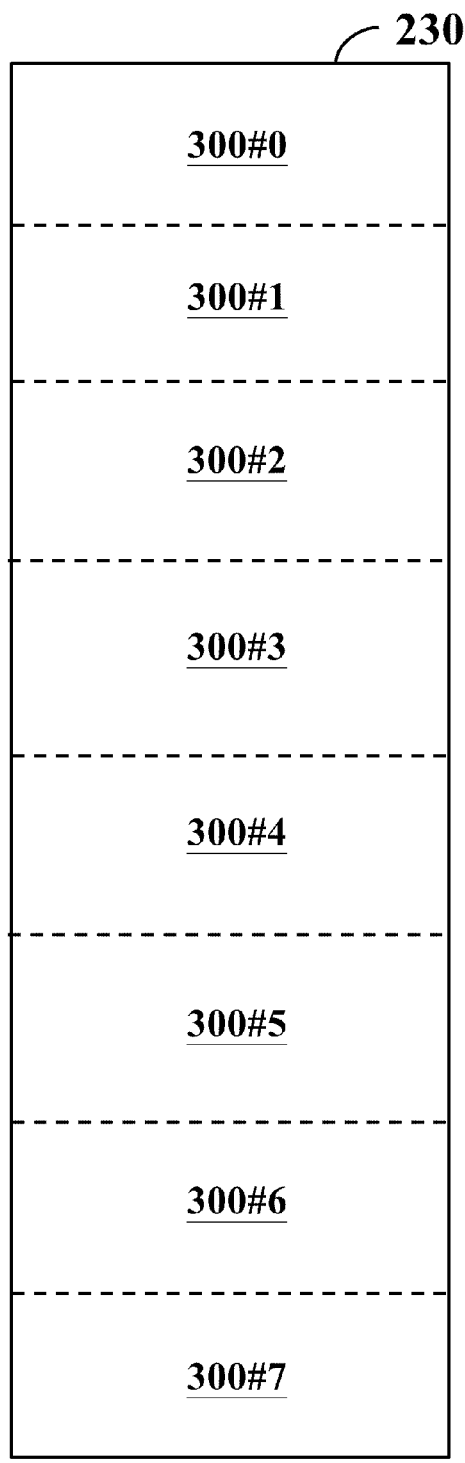
FIG. 3 is a schematic diagram illustrating general-purpose register (GPR) partitions in some implementations.

In some implementations, the GPRs 230 may be physically or logically divided into multiple blocks of equal length, and the storage space of each block is configured to be accessed by only one warp. The storage space between different blocks does not overlap, which is used to avoid access conflicts between different warps. Refer to FIG. 3. For example, since one SM 100 has the capability to process data of eight warps and the GPRs 230 includes 256 KB of storage space, the storage space of GPRs 230 is divided into eight blocks 300#0 to 300#7, and each block contains 32 KB of non-overlapping storage space and is provided to the designated warp to access. However, because the vector computing system nowadays is used in the computation of big data and artificial intelligence with large amount of data, the fixed space partitioning may not be enough for a warp to meet the computation requirements of a large amount of data. In order to apply in the computation of big data and artificial intelligence, the implementations may be modified to allow each SM 100 to process data for only one warp, so that the storage space of the entire GPRs 230 is only used by this warp. But, when two consecutive instructions have data dependency, that is, the input data of the second instruction is the output result after the execution of the first instruction, it would cause the operation of the ALU 210 to be inefficient. In detail, the operations of the SM 100 have bubbles because the second instruction needs to wait for the execution results of the first instruction to be ready in the GPRs 230 before it can be executed. For example, assume that each instruction in the pipeline requires eight clock cycles from the initialization to the result output to the GPRs 230: Since the second instruction needs to wait for the execution result of the first instruction, the execution of the second instruction starts from the $9^{th}$ clock cycle. Thus, the instruction execution latency is eight clock cycles, resulting in a very low utilization rate of the pipeline. Additionally, because each SM 100 is configured to process data of one warp only, all instructions that can be executed in parallel need to be scheduled sequentially, which would not efficient.

In order to eliminate or alleviate the aforementioned problems, from one aspect, the warp instruction scheduler 220 allows each of the warps to access to data of the whole or the designated portion of GPRs 230 through the ALU 210 in accordance with the configurations by the software during execution, and completes the calculations for each warp through the ALU 210. By allowing the software to dynamically adjust and configure the GPRs to be accessed by components for different warps, it would widely adapted to applications, such as big data, artificial intelligence, or other computations.

From another aspect, embodiments of the present invention provide an environment that allows software to determine the instruction segments included in each warp. In some embodiments, instructions in a kernel are divided into segments, in which each instruction segment is independent from the others, and is executed with one warp. Exemplary pseudo code of a kernel is illustrated as follows:

```
if (warp.ID==0) {
    kernel segment for warp 0;
    exit;
} else if (warp.ID==1) {
    kernel segment for warp 1;
    exit;
} else if (warp.ID==2) {
    ...
    ...
    ...
} else if (warp.ID==7) {
    kernel segment for warp 7;
}
```

Assume that each SM 100 runs at most eight warps, and each warp has a unique identifier (ID): The warp instruction scheduler 220 when fetching the aforementioned kernel instructions inspects the warp ID for the designated warp to jump to the instruction segment associated with this warp, and stores the jumped instruction segment in the instruction cache 240. Then, the warp instruction scheduler 220 obtains an instruction from the instruction cache 240 in accordance with the value of corresponding program counter, and sends the obtained instruction to the ALU 210 to complete the designated calculation. In this case, each warp could perform tasks independently, and all warps could be run at the same time, so that the pipeline in the ALU 210 would be as busy as possible to avoid bubbles. Instructions of each segment in the same kernel may be called relatively independent instructions. Although the above example is to add conditional judgment instructions to the kernel to achieve the instruction segmentation, those artisans may use other different instructions that can achieve the same or similar functions to complete the instruction segmentation in the kernel. In the kernel, those instructions used to achieve the instruction segmentation for warps are also referred to as warp dispatch instructions. In general, the warp instruction scheduler 240 allows each warp to have a portion of relatively independent instructions in accordance with the warp dispatch instructions in the kernel, so that the ALU 210 executes the warps independently and in parallel.

The barriers register 250 stores information to be used to synchronize executions between different warps, including the number of warps that need to wait for the completion of other warps, and the number of warps currently waiting to continue execution. In order to coordinate with the execution progress of different warps, the software sets the content of the barriers register 250 to record the number of warps that need to wait for the completion of other warps. A barrier instruction may be inserted into each instruction segment in the kernel in accordance with the system requirement. The warp instruction scheduler 220 when fetching the barrier instruction for a warp increase the number of warps currently waiting to continue execution by one, and puts this warp into the waiting state. Then, the warp instruction scheduler 220 examines the content of barriers register 250 to determine whether the number of warps currently waiting to continue execution is equal to or greater than the number of warps that need to wait for the completion of other warps. If so, the warp instruction scheduler 220 wakes up all waiting warps, so that these warps can continue to execute. Otherwise, the warp instruction scheduler 220 fetches the next warp instruction from the instruction cache 240.

Moreover, the realized segmentation as shown in FIG. 3 is preconfigured for the SMs 100, and cannot be modified by software. However, the storage space required by different warps may be different. For some warps, the pre-divided storage space may be more than necessary, while for other warps, it may be insufficient.

From another aspect, although one SM 100 has the capability of executing multiple warps, embodiments of the invention do not divide the GPRs 230 for different warps in advance. In detail, in order to adapt to different applications more widely, the SM 100 does not divide the GPRs 230 into multiple blocks of equal length for different warps, but provides an environment to allow the software to dynamically adjust and configure the GPRs 230 for different warps, so that the software would assign the whole or the designated portion of GPRs 230 to each warp in accordance with the application requirements.

Figure 4:
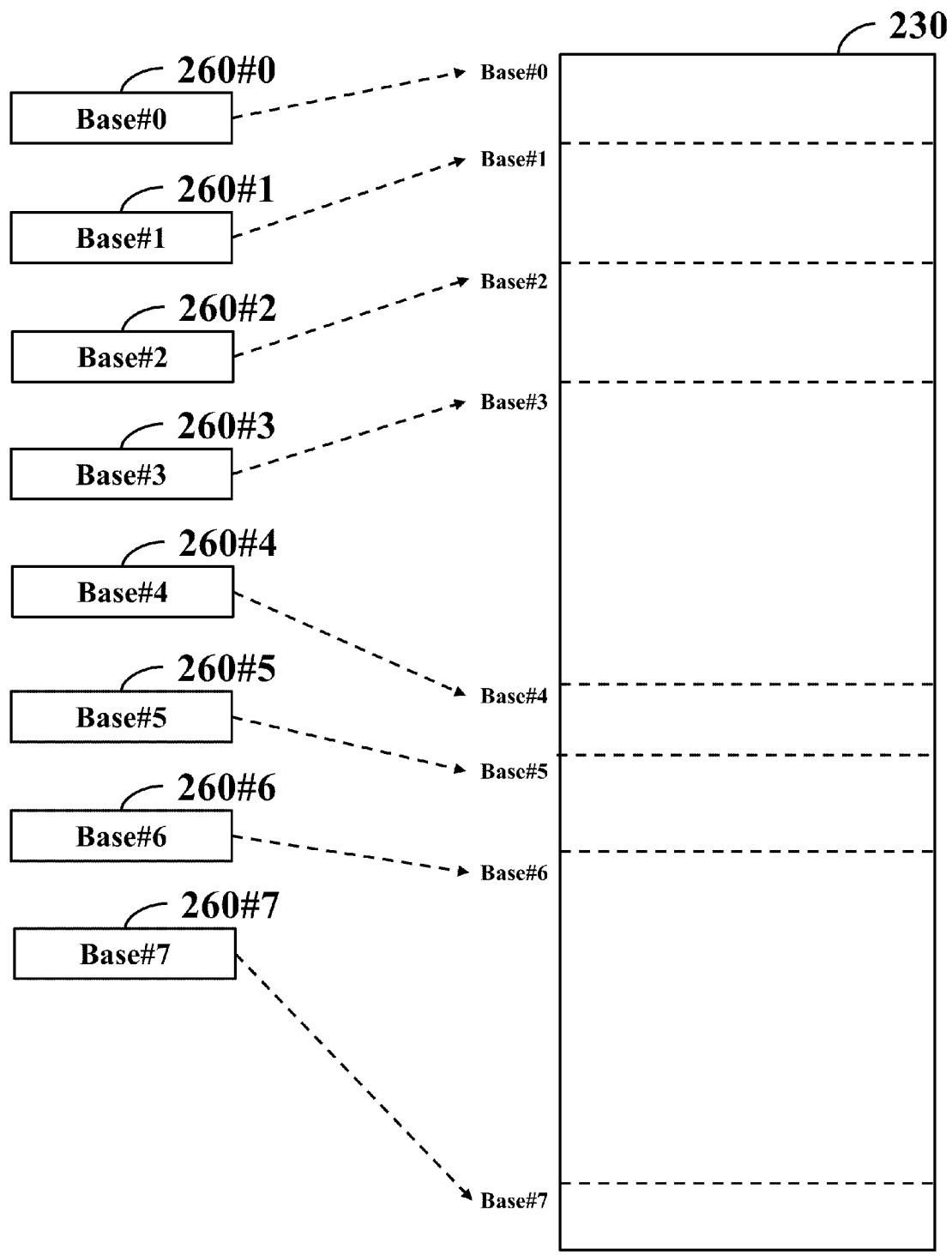
FIG. 4 is a schematic diagram illustrating a dynamic partitioning of GPR with resource-per-warp registers according to an embodiment of the invention.

In alternative embodiments, each SM 100 includes the resource-per-warp register 260 for storing information about a base position for each warp, and each base position points to a specific address of the GPRs 230. In order to allow different warps to access to non-overlapping storage space in the GPRs 230, the software dynamically modifies the content of resource-per-warp registers 260 to set the base position for each warp. For example, refer to FIG. 4. The software may divide the GPRs 230 into eight blocks for eight warps. The $0^{th}$ block is associated with the $0^{th}$ warp, whose addresses range from Base#0 to Base#1 minus 1; the $1^{st}$ block is associated with the $1^{st}$ warp, whose addresses range from Base#1 to Base#1 minus 1; and so on. The software may set the content of resource-per-warp registers 260#0 to 260#7 before or at the beginning of the execution of the kernel to point to the base address of the GPRs 230, which is associated with each warp. The warp instruction scheduler 220 after obtaining an instruction from the instruction cache 240 for the $i^{th}$ warp modifies the source address and the destination address of this instruction in accordance with the content of resource-per-warp register 260#i to map to the storage space in the GPRs 230, which is dynamically configured for the $i^{th}$ warp. For example, the original instruction is:

Dest_addr=Instr_$i$(Src_addr0,Src_addr1)

where Instr_i represents the operation code (OpCode) of the instruction assigned to the $i^{th}$ warp, Src_addr0 represents the $0^{th}$ source address, Src_addr1 represents the $1^{st}$ source address, and Dest_addr represents the destination address.

The warp instruction scheduler 220 modifies the aforementioned instruction to become:

Base#$i$+Dest_addr=Instr_$i$(Base#$i$+Src_addr0,Base#$i$+Src_addr1)

where Base#i represents the base position recorded in the resource-per-warp register 260#i. That is, the warp instruction scheduler 220 adjusts the source addresses and the destination address of the instruction in accordance with the content of corresponding resource-per-warp register 260, so that the designated portions in the GPRs mapped for different warps are not overlapped.

In alternative embodiments, not only instructions in one kernel are divided into multiple independent segments, and each instruction segment is executed with one warp, but also the software sets the content of resource-per-warp registers 260#0 to 260#7 before or at the beginning of the execution of the kernel to point to the base address of the GPRs 230, which is associated with each warp.

Figure 5:
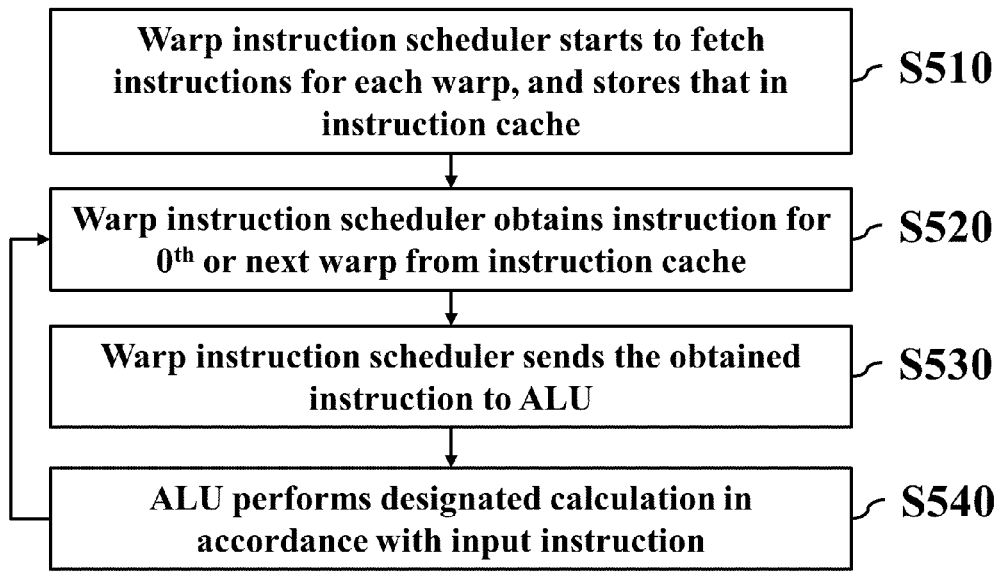
FIG. 5 is a flowchart applied to execute tasks for cooperative warps in parallel according to an embodiment of the invention.

The present invention may be applied to cooperative warps that perform tasks in parallel. Refer to the exemplary flowchart as illustrated in FIG. 5.

Step S510: The warp instruction scheduler 220 starts to fetch instructions for each warp and stores the fetched instructions in the instruction cache 240.

Steps S520 to S540 form a loop. The warp instruction scheduler 220 may use a scheduling method (such as, the round-robin algorithm, etc.) to obtain the designated instructions from the instruction cache 240 one by one in accordance with the corresponding program counters of the warps. The designated instructions are sent to the ALU 210 for execution. For example, the warp instruction scheduler 220 may sequentially obtain the instruction indicated by the program counter of the $0^{th}$ warp, the instruction indicated by the program counter of the $1^{st}$ warp, and so on.

Step S520: The warp instruction scheduler 220 obtains the instruction for the $0^{th}$ or the next warp from the instruction cache 240.

Step S530: The warp instruction scheduler 220 sends the obtained instruction to the ALU 210.

Step S540: The ALU 210 performs the designated calculation in accordance with the input instruction. In the pipeline for executing the instruction, the ALU 210 obtains data from the source address(es) in the GPRs 230, performs the designated operation on the obtained data, and stores the calculation result in the destination address in the GPRs 230.

In order to prevent different warps from conflicting when accessing to the GPRs 230, in some embodiments of step S510, the warp instruction scheduler 220 allows each warp to process instructions (also called as relatively independent instructions) of the designated segment in the same kernel in accordance with the warp dispatch instructions (may refer to the above pseudo code). The instruction segments are arranged to be independent from each other, and can be executed in parallel.

In alternative embodiments, the warp instruction scheduler 220 before sending the instruction to the ALU (before step S530), modifies the source address(es) and the destination address of the instruction in accordance with the content of corresponding resource-per-warp register 260 to map to the storage space in the GPRs 230, which is dynamically configured to this warp.

In alternative embodiments, the warp instruction scheduler 220 not only allows each warp to process instructions (also called as relatively independent instructions) of the designated segment in the same kernel in accordance with the warp dispatch instructions (may refer to the above pseudo code) in step S510, but also, before sending the instruction to the ALU (before step S530), modifies the source address(es) and the destination address of the instruction in accordance with the content of corresponding resource-per-warp register 260.

Figure 6:
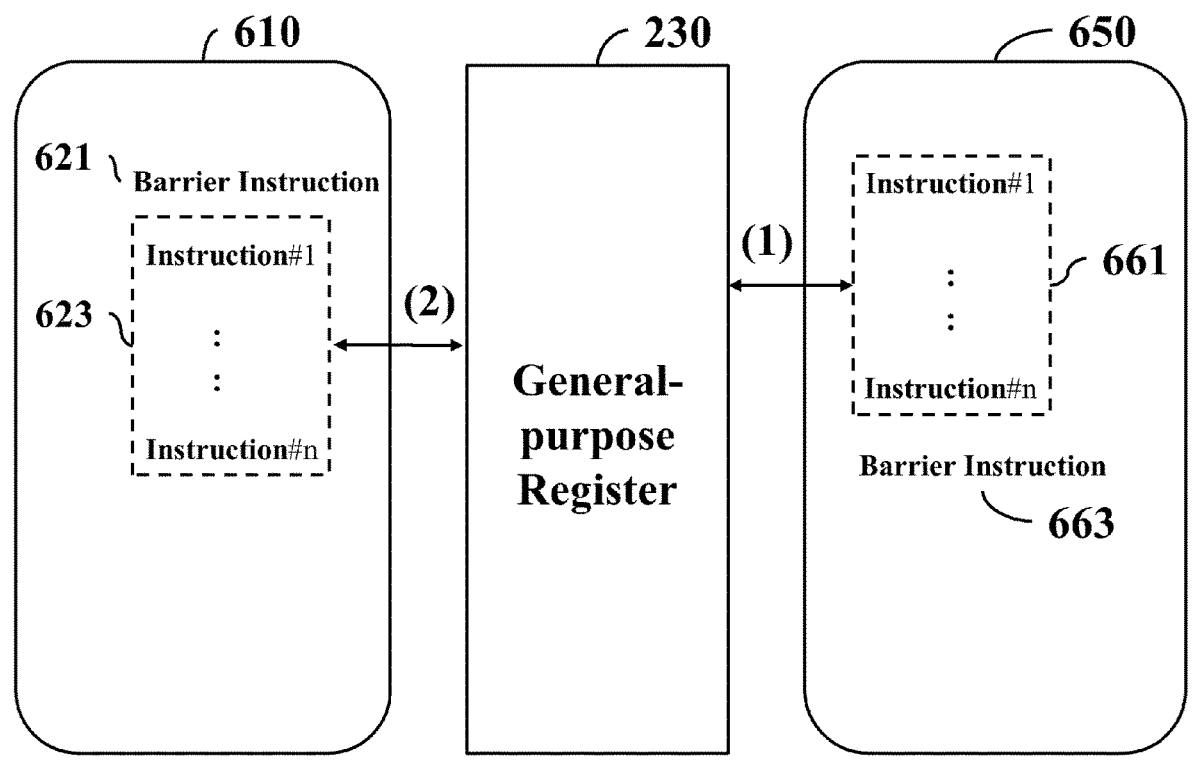
FIG. 6 is a schematic diagram illustrating cooperative warps of a producer and a consumer according to an embodiment of the invention.

The present invention would be applied to the executions of cooperative producer-consumer warps. Refer to FIG. 6. Suppose that the warp 610 is a data consumer while the warp 650 is a data producer. In other words, the executions of at least a portion of instructions in the warp 610 requires to refer to the execution results of at least a portion of instructions in the warp 650. In some embodiments, the software sets the content of resource-per-warp registers corresponding to the warps 610 and 650 during execution, which allows the instructions in the warps 610 and 650 can access to the overlapped block in the GPRs 230 through the ALU 210.

Figure 7:
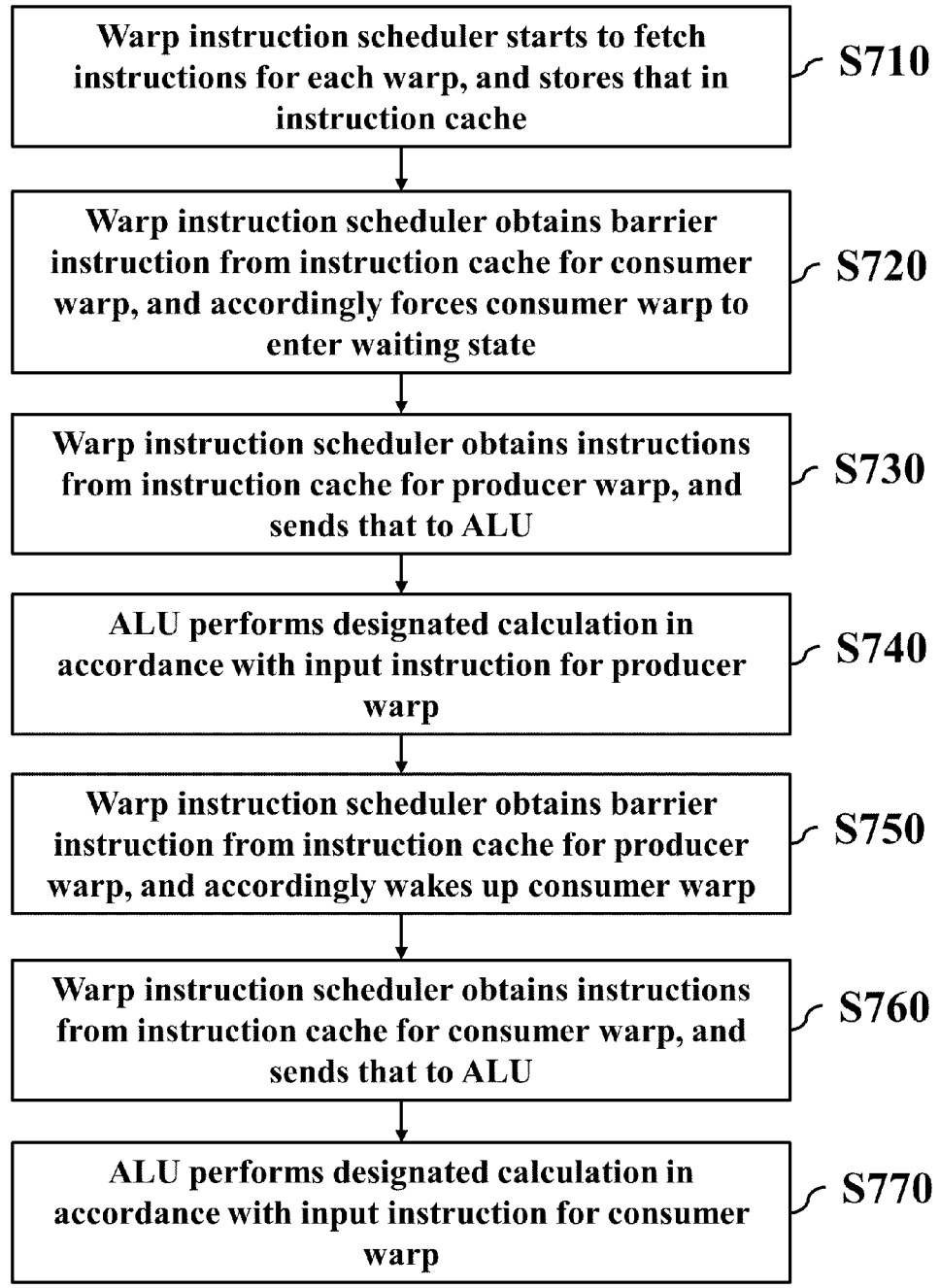
FIG. 7 is a flowchart applied to execute cooperative warps of a producer-consumer task according to an embodiment of the invention.

Regarding the producer-consumer task executions, for details, refer to the exemplary flowchart as shown in FIG. 7.

Step S710: The warp instruction scheduler 220 starts to fetch instructions for each warp and stores the fetched instructions in the instruction cache 240. The warp instruction scheduler 220 may make each warp responsible for processing instructions of the designated segment in the same kernel in accordance with the warp dispatch instructions (may refer to the above pseudo code). These instruction segments are arranged to form the producer-consumer relationship.

Step S720: The warp instruction scheduler 220 obtains the barrier instruction 621 from the instruction cache 240 for the consumer warp 610, and accordingly forces the consumer warp 610 to enter the waiting state.

Step S730: The warp instruction scheduler 220 obtains a series of instructions 661 from the instruction cache 240 for the producer warp 650, and sends the obtained instructions to the ALU 210 sequentially.

Step S740: The ALU 210 performs the designated calculation in accordance with the input instruction. In the pipeline for executing the instruction, the ALU 210 obtains data from the source address(es) in the GPRs 230, performs the designated operation on the obtained data, and stores the calculation result in the destination address in the GPRs 230.

Step S750: The warp instruction scheduler 220 obtains the barrier instruction 663 from the instruction cache 240 for the producer warp 650, and accordingly wakes up the consumer warp 610. In some embodiments, the warp instruction scheduler 220 may force the producer warp 650 to enter the waiting state.

Step S760: The warp instruction scheduler 220 obtains a series of instructions 623 from the instruction cache 240 for the consumer warp 610, and sends the obtained instructions to the ALU 210 sequentially.

Step S770: The ALU 210 performs the designated calculation in accordance with the input instruction. In the pipeline for executing the instruction, the ALU 210 obtains data (including the data previously generated by the producer warp 650) from the source address(es) in the GPRs 230, performs the designated operation on the obtained data, and stores the calculation result in the destination address in the GPRs 230.

It is to be noted that the content of steps S730, S740, S760, and S770 are merely brief descriptions for easy understanding. During the execution of steps S730, S740, S760, and S770, the warp instruction scheduler 220 may obtain instructions from the instruction cache 240 for other warps (that is, neither the warp 610 nor the warp 650), and drive the ALU 210 to perform relevant calculations.

Although the embodiment has been described as having specific elements in FIGS. 1, and 2, it should be noted that additional elements may be included to achieve better performance without departing from the spirit of the invention. Each element of FIGS. 1, and 2 is composed of various circuits and arranged to operably perform the aforementioned operations. While the process flows described in FIGS. 5, and 7 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for configuring cooperative warps in a vector computing system, comprising:
    a plurality of general-purpose registers (GPRs);
    an arithmetic logical unit (ALU), coupled to the GPRs;
    a warp instruction scheduler, coupled to the ALU, arranged operably to: allow each of a plurality of warps to access data of a whole or a designated portion of the GPRs through the ALU in accordance with a configuration while a software is executed; and complete calculations of each warp through the ALU; and
    a plurality of resource-per-warp registers,
    wherein each resource-per-warp register is associated with one warp, and is arranged operably to: store a base address corresponding to an associated warp,
    wherein the warp instruction scheduler before sending an instruction associated with one warp to the ALU is arranged operably to: modify a source address and a destination address of the instruction in accordance with content of a corresponding resource-per-warp register, thereby enabling the instruction when being executed by the ALU to access the designated portion of the GPRs only,
    wherein the content of the corresponding resource-per-warp register is set while the software is executed,
    wherein the warps comprise a consumer warp and a producer warp, each of the consumer warp and the producer warp is composed of group of threads, and each thread is a basic unit that is run by hardware,
    wherein executions of a plurality of instructions in the consumer warp refer to execution results of a plurality of instructions in the producer warp,
    wherein the warp instruction scheduler is arranged operably to: acquire a first barrier instruction for the consumer warp from an instruction cache, force the consumer warp to a waiting state, obtain a producer instruction for the producer warp from the instruction cache, modify a first source address and a first destination address of the producer instruction in accordance with content of a corresponding resource-per-warp register, and send the producer instruction with a modified first source address and a modified first destination address to the ALU in response to an acquisition of the first barrier instruction for the consumer warp from the instruction cache, wherein the warp instruction scheduler is arranged operably to: acquire a second barrier instruction for the producer warp from the instruction cache, wake up the consumer warp, obtain a consumer instruction for the consumer warp from the instruction cache, modify a second source address and a second destination address of the consumer instruction in accordance with content of a corresponding resource-per-warp register, and send the consumer instruction with a modified second source address and a modified second destination address to the ALU in response to an acquisition of the second barrier instruction for the producer warp from the instruction cache, wherein the consumer warp and the producer warp are configured to associate with an overlapping block in the GPRs by setting the corresponding resource-per-warp registers, wherein the overlapping block is for performing direct data exchange between the consumer warp and the producer warp.

2. The apparatus of claim 1, wherein the apparatus does not allocate the whole or the designated portion of the GPRs for each warp, in advance.

3. The apparatus of claim 1, comprising:
wherein each resource-per-warp register is arranged operably to: map a data access for a corresponding warp to a designated portion of the GPRs.

4. The apparatus of claim 1, wherein the consumer warp requires to refer to an execution result of an instruction in the producer warp.

5. A method for configuring cooperative warps in a vector computing system, performed by a warp instruction scheduler, the method comprising:
allowing each of a plurality of warps to access data of a whole or a designated portion of general-purpose registers (GPRs) through an arithmetic logical unit (ALU) in accordance with a configuration by a software when being executed; and
completing calculations of each warp through the ALU, the method, performed by the warp instruction scheduler, comprising:
providing a base address corresponding to each warp; and
before sending an instruction associated with one warp to the ALU, modifying a source address and a destination address of the instruction in accordance with a corresponding base address, thereby enabling the instruction when being executed by the ALU to access the designated portion of the GPRs only, wherein the corresponding base address is provided according to a content of a corresponding resource-per-warp register, which is set while a software is executed, wherein the warps comprise a consumer warp and a producer warp, each of the consumer warp and the producer warp is composed of group of threads, and each thread is a basic unit that is run by hardware, wherein executions of a plurality of instructions in the consumer warp refer to execution results of a plurality of instructions in the producer warp, the method, performed by the warp instruction scheduler, comprising:
acquiring a first barrier instruction for the consumer warp from an instruction cache;
forcing the consumer warp to a waiting state, obtaining a producer instruction for the producer warp from the instruction cache, modifying a first source address and a first destination address of the producer instruction in accordance with a corresponding base address for the producer warp, and sending the producer instruction with a modified first source address and a modified first destination address to the ALU in response to an acquisition of the first barrier instruction for the consumer warp from the instruction cache;
acquiring a second barrier instruction for the producer warp from the instruction cache; and
waking up the consumer warp, modifying a second source address and a second destination address of a consumer instruction in accordance with a corresponding base address for the consumer warp, and sending the consumer instruction with a modified second source address and a modified second destination address to the ALU in response to an acquisition of the second barrier instruction for the producer warp from the instruction cache,
wherein the consumer warp and the producer warp are configured to associate with an overlapping block in the GPRs by setting the corresponding resource-per-warp registers,
wherein the overlapping block is for performing direct data exchange between the consumer warp and the producer warp.

6. The method of claim 5, wherein the streaming multiprocessor comprises the GPRs and the ALU.

7. The method of claim 5, wherein the streaming multiprocessor does not allocate the whole or the designated portion of the GPRs for each warp, in advance.

8. The method of claim 5, wherein the consumer warp requires to refer to an execution result of an instruction in the producer warp.

9. The method of claim 5, comprising:
mapping a data access for each of the warps to a designated portion of GPRs in accordance with content of a plurality of resource-per-warp registers.

10. The method of claim 9, wherein the streaming multiprocessor comprises the GPRs, the ALU, and the resource-per-warp registers.

* * * * *